No. 628,544. Patented July 11, 1899.
T. H. MACDONALD.
MACHINE FOR MAKING GRAPHOPHONE RECORDING STYLES.
(Application filed Oct. 31, 1898.)
(No Model.)
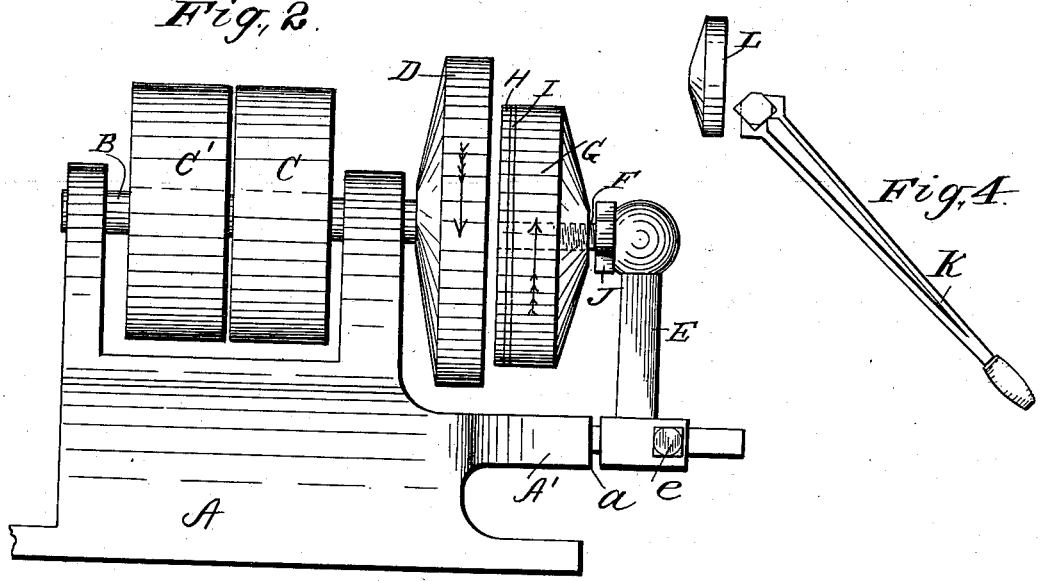
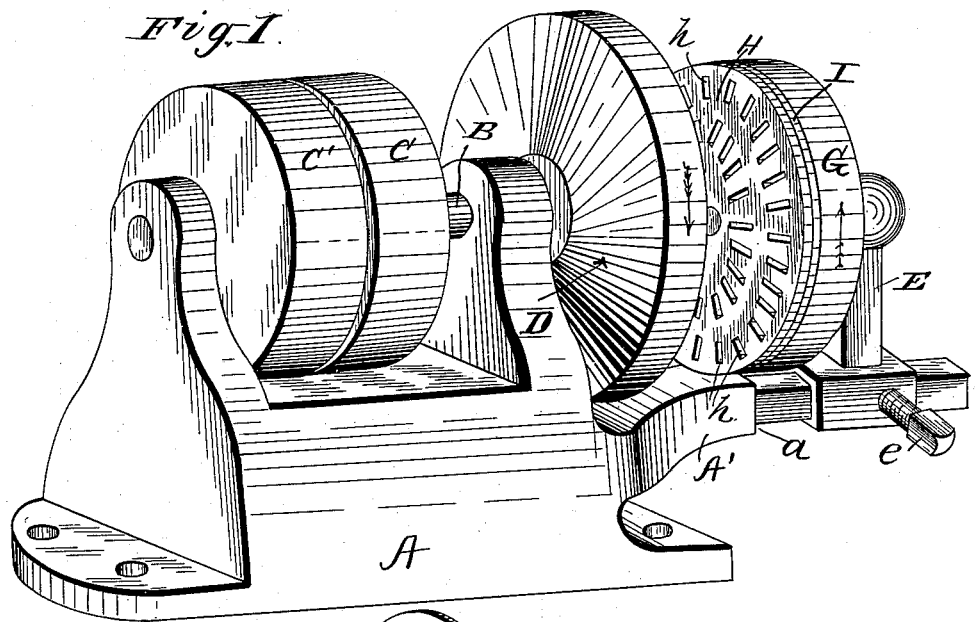
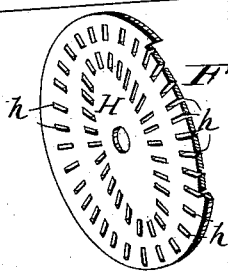
Witnesses.
W. R. Edelen.
Inventor
Thomas H. Macdonald
by Pouras Mauro
his attorneys

UNITED STATES PATENT OFFICE.

THOMAS H. MACDONALD, OF BRIDGEPORT, CONNECTICUT, ASSIGNOR TO THE AMERICAN GRAPHOPHONE COMPANY, OF WEST VIRGINIA.

MACHINE FOR MAKING GRAPHOPHONE RECORDING-STYLES.

SPECIFICATION forming part of Letters Patent No. 628,544, dated July 11, 1899.

Application filed October 31, 1898. Serial No. 695,047. (No model.)

*To all whom it may concern:*

Be it known that I, THOMAS H. MACDONALD, a resident of Bridgeport, Connecticut, have invented a new and useful Improvement in Machines for Making Graphophone Recording-Styles, which invention is fully set forth in the following specification.

My invention relates to the cutting-toll or "recording-stylus" of graphophones and the means employed for shaping or grinding the same to the proper form for use in connection with a recording-diaphragm.

The recording-stylus as commonly constructed is of sapphire and is cylindrical in form. Sapphires are produced in the shape of a rough mass of irregular form and are first cut into slabs of the proper thickness by means of gang-saws. The slabs are then cemented together and again presented to the gang-saws, the line of cut, however, being at right angles to the first cut. Upon dissolving the cement the sapphires are bound in the form of four-sided prisms of greater or less length and of a thickness equal to the proposed diameter of the stylus. These prisms are then cut or broken into suitable lengths, after which it is necessary that the angular prisms be reduced to cylinders and properly polished. Heretofore this has been accomplished by cementing one end of the prism into a chuck carried by a turning-lathe and holding a lap against it until it is reduced from a prismatic to a cylindrical form. Among the many objections and disadvantages incident to this manner of forming and polishing the cylinders are its tediousness and expense, the skilled labor required to accurately manipulate the lap to the end that a true cylinder might be formed and of the desired diameter, and the waste due to the fact that the end of the prism held in the chuck is not treated by the lap and has to be discarded.

The objects of the present invention are to produce means whereby a number of the prisms may be simultaneously, cheaply, and expeditiously converted into cylinders of the desired diameter and to avoid the waste incident to the old method by converting the prism throughout its entire length into a cylinder.

With these objects in view my invention consists in means whereby a number of prisms of approximately the length of the finished stylus may be simultaneously presented to the grinding action of a lap, combined with means for revolving the prisms about their longitudinal axes, whereby the angles of the prisms are submitted to the action of the lap and removed.

The invention further consists in certain details which will be hereinafter described and then pointed out in the claims.

In the accompanying drawings I have illustrated one of the many forms which my invention may assume, in which drawings—

Figure 1 is a perspective, and Fig. 2 a side elevation, of my machine. Fig. 3 is a face view of the prism-holder, and Fig. 4 shows the manner of using pincers for applying the square prisms to a lap to remove the more prominent angles.

In the drawings, in which like letters refer to like parts throughout, A is a suitable base or frame in which turns a shaft B, having thereon the fast driving-pulley C and the loose pulley C'. On a projecting end of the shaft B is a lap D, the body of which is preferably formed of copper and the front face of which is coated with diamond-dust or equivalent material for forming a grinding and polishing surface.

E is a standard adjustably secured on the projecting arm A' of the frame A. I have shown a set-screw *e* as a convenient means of securing the standard in its adjusted position.

F is a shaft secured in the standard E and projecting horizontally toward the face of the lap D, but with its axial line somewhat below that of the shaft B.

G is a wheel or disk, preferably of wood, mounted to turn freely on the shaft F, and of less diameter than the lap D. This disk G is revolved in a direction opposite to that of the lap D by any suitable mechanism—as, for example, a belt passing around the disk and extending to a driving-shaft.

H is a disk or carrier, preferably of red fiber, secured loosely on the shaft F opposite the face of the lap D, as shown, and I is a thin disk of india-rubber or other suitable yielding material which is preferably placed between the carrier H and the disk G, though it may be omitted, if desired. The carrier H has a number of oblong slots $h$ formed therein, each of these slots being of a proper size to receive a single prism. Means, such as a nut J, threaded on the shaft F, may be employed to adjust the position of the disk G relative to the lap D. Previous to placing the prisms in the slots $h$ of the carrier H, I prefer to reduce the four-sided prisms to eight-sided prisms by grasping them in a pair of pincers K and applying them to a lap L, as shown in Fig. 4. This, however, is not necessary, and, if desired, the four-sided prisms may be placed directly in the carrier.

The operation is as follows: The prisms are placed in the slots $h$ of the carrier H and the operator presses the standard E, so as to bring the prisms into contact with the face of the lap D, the disk G and the lap D being meanwhile revolved in opposite directions, the lap being preferably driven the faster. The effect of this action is that the disk G, carrying with it the yielding disk I, causes the prisms to turn over and over and the lap D grinds off their protruding angular edges, a certain amount of give in the disk I preventing any damage to the sapphires. After a few moments' treatment the prisms will be found to be reduced to cylinders of uniform diameter. A continuation of the treatment may be resorted to for polishing the cylinders. The gage or diameter of the cylinders is determined by the position of the nut J, and it may be adjusted to produce cylinders of greater or less diameter, as desired. By placing the shafts B and F with their axes in the same vertical but different horizontal planes practically the entire surface of the face of the lap is utilized in the grinding action and the wear upon the lap is even and uniform, whereas if the shafts B and F were placed with their axes in the same line the wear would be in circular grooves, which would very much shorten the life of the lap. After the sapphires have been reduced to cylindrical form they may be finished by "squaring" or "cupping" the ends as may be desired.

It will be understood that while the machine herein described is the construction which I prefer there may be numerous mechanical expressions of the inventive ideas embodied therein, and I do not therefore limit myself to the particular construction shown.

Having thus described my invention, what I claim as new is—

1. The combination of a lap, a frame supporting the same and means for revolving the lap, with means for presenting a plurality of angular articles to the face of the lap and means for revolving said articles about their longitudinal axes, substantially as described.

2. The combination of a lap, a frame supporting the same, and means for revolving the lap, with a carrier for presenting a plurality of prisms to the face of the lap, and means for turning the prisms in said carrier, substantially as described.

3. The combination of a lap, a frame supporting the same, and means for revolving the lap, with a carrier for presenting a plurality of prisms to the lap, means for automatically turning the prisms in the carrier and revolving the carrier, substantially as described.

4. The combination of a lap, and means for revolving the same, with a carrier for presenting a plurality of prisms to the face of the lap and means for revolving the carrier on an axis eccentric to the axis of the lap, substantially as described.

5. The combination of a lap, and means for revolving the same, with a disk revolving on an axis eccentric to said lap, a carrier turning loosely on the axis of the disk, the disk and carrier being movable to and from the face of the lap, substantially as described.

6. The combination of a lap, and means for revolving the same, with an adjustable disk revolving on an axis eccentric to said lap, a slotted carrier turning loosely in the axis of the disk, a slab of yielding material interposed between the disk and carrier and means for revolving the disk in the opposite direction from the lap, substantially as described.

7. The combination of a lap, and means for revolving the same, of a standard adjustable toward and from the face of the lap, a shaft projecting from said standard toward the lap, a disk revolving in said shaft and adjustable longitudinally thereof, a slotted carrier turning loosely on said shaft adjacent to the face of lap, a slab of yielding material interposed between the disk and carrier, and means for revolving the disk, substantially as described.

In testimony whereof I have signed this specification in the presence of two subscribing witnesses.

THOMAS H. MACDONALD.

Witnesses:
WILLIAM I. STAU,
R. IRWIN SMITH.